(12) United States Patent
Khawer (10) Patent No.: US 9,357,482 B2
(45) Date of Patent: May 31, 2016

(54) METHOD AND SYSTEM FOR DYNAMIC POWER CONTROL FOR BASE STATIONS

(75) Inventor: Mohammad R. Khawer, Lake Hopatcong, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 287 days.

(21) Appl. No.: 13/181,608

(22) Filed: Jul. 13, 2011

(65) Prior Publication Data

US 2013/0017854 A1    Jan. 17, 2013

(51) Int. Cl.
| | | |
|---|---|---|
| *H04W 52/24* | (2009.01) | |
| *H04W 52/02* | (2009.01) | |
| *H04W 52/14* | (2009.01) | |
| H04W 88/08 | (2009.01) | |
| H04W 52/26 | (2009.01) | |
| H04W 52/34 | (2009.01) | |

(52) U.S. Cl.
CPC ........ *H04W 52/0206* (2013.01); *H04W 52/143* (2013.01); *H04W 52/267* (2013.01); *H04W 52/343* (2013.01); *H04W 88/08* (2013.01)

(58) Field of Classification Search
CPC ......... G06F 9/505; G06F 15/16; H04W 52/28
USPC .................................................. 455/522, 69
See application file for complete search history.

(56) References Cited

U.S. PATENT DOCUMENTS

| | | | |
|---|---|---|---|
| 5,408,464 A | 4/1995 | Jurkevich | |
| 5,913,230 A | 6/1999 | Richardson | |
| 6,115,748 A | 9/2000 | Hauser et al. | |
| 6,735,620 B1 | 5/2004 | Blackmore et al. | |
| 6,799,200 B1 | 9/2004 | Blackmore et al. | |
| 6,999,432 B2 | 2/2006 | Zhang et al. | |
| 7,003,042 B2 | 2/2006 | Morelos-Zaragoza et al. | |

(Continued)

FOREIGN PATENT DOCUMENTS

| | | |
|---|---|---|
| EP | 1 788 491 | 5/2007 |
| TW | 200813739 | 3/2008 |

(Continued)

OTHER PUBLICATIONS

"Emerson Network Power: AMC-9210 AdvancedMC Module Preliminary Data Sheet", http://www.powerbridge.de, Jun. 1, 2008, pp. 1-3.

(Continued)

*Primary Examiner* — Hai V Nguyen
(74) *Attorney, Agent, or Firm* — Fay Sharpe LLP (57) ABSTRACT

A method and system for dynamic power control for next generation LTE base stations are described herein. More particularly, a dynamic power control management process may run, for example, in an OA&M module on the control plane core of the base station. The dynamic power control management process collaborates with various components, such as a call management processing module and a transport process module, to periodically obtain information regarding the number of active calls as well as the uplink and downlink data rates for a given interval for a particular cell. The dynamic power control management process polls the call management processing module and transport process module periodically according to a tunable parameter for the key values. Based on this information, the dynamic power control management process determines whether a particular cell on the base station is running below a threshold at which dynamic power control could be triggered.

20 Claims, 5 Drawing Sheets

(56) References Cited

U.S. PATENT DOCUMENTS

| | | | |
|---|---|---|---|
| 7,089,289 B1 | 8/2006 | Blackmore et al. | |
| 7,093,013 B1 | 8/2006 | Hornok, Jr. et al. | |
| 7,096,034 B2 | 8/2006 | Zhang et al. | |
| 7,180,866 B1 | 2/2007 | Chartre et al. | |
| 7,206,966 B2 | 4/2007 | Barr et al. | |
| 7,254,812 B1* | 8/2007 | Menezes | 718/102 |
| 7,352,693 B2 | 4/2008 | Seid et al. | |
| 7,451,456 B2 | 11/2008 | Andjelic | |
| 7,571,440 B2 | 8/2009 | Vessey et al. | |
| 7,590,050 B2 | 9/2009 | Foltak | |
| 7,603,256 B2 | 10/2009 | Cheng et al. | |
| 7,609,652 B2 | 10/2009 | Kellerer et al. | |
| 7,620,753 B1 | 11/2009 | Beaman et al. | |
| 7,656,815 B2 | 2/2010 | Kellerer et al. | |
| 7,668,191 B2 | 2/2010 | Steinback et al. | |
| 7,831,710 B2 | 11/2010 | Ing et al. | |
| 7,865,751 B2* | 1/2011 | Monferrer | H01L 23/34 713/300 |
| 7,873,964 B2 | 1/2011 | Huang et al. | |
| 7,889,019 B2* | 2/2011 | Gizara | G06F 1/025 327/172 |
| 7,933,197 B2 | 4/2011 | Bryant et al. | |
| 7,953,915 B2 | 5/2011 | Ge et al. | |
| 7,961,023 B2* | 6/2011 | Gizara | H02M 3/157 323/223 |
| 8,024,417 B2 | 9/2011 | Mehrotra | |
| 8,059,532 B2 | 11/2011 | Riddle et al. | |
| 8,072,879 B2 | 12/2011 | Vasseur et al. | |
| 8,099,546 B2 | 1/2012 | Rostedt | |
| 8,271,996 B1 | 9/2012 | Gould et al. | |
| 8,286,016 B2* | 10/2012 | Monferrer | H01L 23/34 713/300 |
| 8,504,744 B2 | 8/2013 | Khawer et al. | |
| 8,611,942 B2* | 12/2013 | Kapoor | H04W 36/0055 370/331 |
| 8,788,860 B2* | 7/2014 | Monferrer | H01L 23/34 713/300 |
| 8,818,441 B2* | 8/2014 | Haim | H04W 52/367 370/318 |
| 2002/0087710 A1 | 7/2002 | Aiken et al. | |
| 2003/0188233 A1 | 10/2003 | Lubbers et al. | |
| 2004/0062246 A1 | 4/2004 | Boucher et al. | |
| 2004/0081080 A1 | 4/2004 | Ji et al. | |
| 2004/0187117 A1 | 9/2004 | Orion et al. | |
| 2005/0008011 A1 | 1/2005 | Georgiou et al. | |
| 2005/0111389 A1 | 5/2005 | Dick et al. | |
| 2006/0003792 A1* | 1/2006 | Gholmieh et al. | 455/522 |
| 2006/0041737 A1 | 2/2006 | Kumagai | |
| 2006/0046819 A1 | 3/2006 | Nguyen et al. | |
| 2007/0010281 A1 | 1/2007 | Sebire | |
| 2007/0104204 A1 | 5/2007 | Brokenshire et al. | |
| 2007/0195723 A1* | 8/2007 | Attar et al. | 370/318 |
| 2007/0220294 A1* | 9/2007 | Lippett | 713/320 |
| 2008/0002681 A1 | 1/2008 | Bajic et al. | |
| 2008/0002702 A1 | 1/2008 | Bajic et al. | |
| 2008/0107014 A1 | 5/2008 | Huang et al. | |
| 2008/0276056 A1 | 11/2008 | Giacomoni et al. | |
| 2008/0310099 A1* | 12/2008 | Monferrer | H01L 23/34 361/679.46 |
| 2009/0055826 A1 | 2/2009 | Bernstein et al. | |
| 2009/0080369 A1 | 3/2009 | Uminski et al. | |
| 2009/0097397 A1 | 4/2009 | Moreira Sa de Souza | |
| 2009/0122756 A1 | 5/2009 | Gu et al. | |
| 2009/0165004 A1* | 6/2009 | Moses | G06F 9/505 718/102 |
| 2009/0207726 A1 | 8/2009 | Thomson et al. | |
| 2009/0228890 A1 | 9/2009 | Vaitovirta et al. | |
| 2009/0248934 A1 | 10/2009 | Ge et al. | |
| 2010/0008218 A1 | 1/2010 | Dumov et al. | |
| 2010/0029266 A1 | 2/2010 | van Gassel et al. | |
| 2010/0080116 A1 | 4/2010 | Agashe et al. | |
| 2010/0121975 A1 | 5/2010 | Sinha et al. | |
| 2010/0157814 A1 | 6/2010 | Ha et al. | |
| 2010/0184432 A1* | 7/2010 | Yano et al. | 455/435.1 |
| 2010/0271097 A1* | 10/2010 | Gizara | H02M 3/157 327/172 |
| 2010/0278038 A1 | 11/2010 | Stahle et al. | |
| 2010/0295859 A1 | 11/2010 | Stauffer et al. | |
| 2010/0296428 A1 | 11/2010 | Ho | |
| 2010/0315561 A1 | 12/2010 | Cooper et al. | |
| 2010/0318996 A1 | 12/2010 | Harris et al. | |
| 2010/0322067 A1 | 12/2010 | Tenny | |
| 2010/0322250 A1 | 12/2010 | Shetty et al. | |
| 2010/0331056 A1* | 12/2010 | Taghavi Nasrabadi et al. | 455/574 |
| 2011/0044165 A1 | 2/2011 | Ni et al. | |
| 2011/0069650 A1 | 3/2011 | Singh et al. | |
| 2011/0072283 A1* | 3/2011 | Monferrer | H01L 23/34 713/300 |
| 2011/0081936 A1* | 4/2011 | Haim | H04W 52/367 455/522 |
| 2011/0093733 A1* | 4/2011 | Kruglick | 713/340 |
| 2011/0105173 A1* | 5/2011 | Haim | H04W 52/244 455/522 |
| 2011/0105174 A1* | 5/2011 | Pelletier | H04W 52/367 455/522 |
| 2011/0122884 A1 | 5/2011 | Tsirkin | |
| 2011/0138387 A1* | 6/2011 | Ahn et al. | 718/1 |
| 2011/0263281 A1* | 10/2011 | Cai | H04B 7/0404 455/501 |
| 2011/0292824 A1 | 12/2011 | Uemura et al. | |
| 2012/0028636 A1 | 2/2012 | Khawer et al. | |
| 2012/0069728 A1 | 3/2012 | Jung et al. | |
| 2012/0079290 A1* | 3/2012 | Kumar et al. | 713/300 |
| 2012/0093047 A1 | 4/2012 | Khawer et al. | |
| 2012/0110223 A1 | 5/2012 | Khawer et al. | |
| 2012/0120965 A1 | 5/2012 | Khawer et al. | |
| 2012/0131376 A1 | 5/2012 | Khawer et al. | |
| 2012/0134320 A1 | 5/2012 | Khawer et al. | |
| 2012/0155398 A1 | 6/2012 | Oyman et al. | |
| 2012/0207011 A1 | 8/2012 | Franklin et al. | |
| 2013/0061231 A1 | 3/2013 | Zhang et al. | |
| 2013/0117305 A1 | 5/2013 | Varakin et al. | |
| 2013/0185579 A1* | 7/2013 | Monferrer | H01L 23/34 713/323 |
| 2014/0068285 A1* | 3/2014 | Lee | G06F 1/324 713/300 |
| 2015/0286262 A1* | 10/2015 | Park | G05D 23/1917 713/320 |

FOREIGN PATENT DOCUMENTS

| | | |
|---|---|---|
| WO | WO 01/63416 | 8/2001 |
| WO | WO 02/07464 | 1/2002 |
| WO | WO 2005/098623 | 10/2005 |
| WO | WO 2008/005793 | 1/2008 |

OTHER PUBLICATIONS

Freescale Semiconductor; QorIQ™ P4080 Communications Processor Product Brief; Sep. 2008; Freescale Semiconductor, Inc.; Rev. 1; pp. 2-5, 14-15, 19-22, 28-29.

RapidIO Trade Association; RapidIO™ Interconnect Specification; Jun. 2002; RapidIO™ Trade Association; Rev. 1.2; p. II-10.

Siu, Sam, "An Introduction to the QorIQ™ Data Path Acceleration Architecture (DPAA)"; Jun. 23, 2010; Freescale Semiconductor, Inc; FTF-NET-F0444; pp. 1-21.

Wang, Shrek ; An Introduction to the QorIQ™ Data Path Acceleration Architecture (DPAA); Aug. 2009; Freescale Technology Forum; 1-12.

Freescale Semiconductor; QorIQ™ P4080 Communications Processor Product Brief; Sep. 2008; Freescale Semiconductor, P4080PB; Rev. 1, p. 1-33.

Palaniappan, Sathish K., et al., "Efficient data transfer through zero copy", IBM Corporation, Sep. 2008.

International Search Report dated Oct. 24, 2012.

Taiwan Search Report (with English Translation) dated Jan. 16, 2014 (from related U.S. Appl. No. 12/847,414).

US 6,014,703, 01/2000, McCrory et al. (withdrawn)

* cited by examiner

METHOD AND SYSTEM FOR DYNAMIC POWER CONTROL FOR BASE STATIONS

BACKGROUND

The exemplary embodiments described herein relate generally to wireless telecommunications. In particular, various embodiments are directed to techniques for improving power control at base stations that employ multi-core processors. While the exemplary embodiments are particularly directed to the art of wireless telecommunications, and will be thus described with specific reference thereto, it will be appreciated that the exemplary embodiments may have usefulness in other fields and applications.

By way of background, LTE (Long Term Evolution) is a rapidly evolving 3GPP project that aims to improve the UMTS (Universal Mobile Telecommunications System) mobile phone standard to cope with future communication network demands. LTE improves wireless network efficiency and bandwidth, lowers costs, and enhances the service experience. Specifically, LTE makes use of new spectrum opportunities and offers better integration with other open standards. LTE generally includes an LTE RAN (Radio Access Network) (also known as E-UTRAN) along with an EPS (Evolved Packet System, also called Evolved Packet Core).

Communication systems are generally split into two primary functions: data plane functions and control plane functions. In previous LTE products, at least two processors were used on the modem board: one processor to support the control plane functions (non-real time, e.g., Operations, Administration, and Management (or OA&M), call management processing-related functionalities, and transport processing), and another processor to terminate and support the data plane functions (real time, e.g., LTE Layer 2 processing). Both the control and data planes used different operating system (OS) instances, such as Linux for the control plane and a real-time OS such as vXWorks (made and sold by Wind River Systems of Alameda, Calif.) for the data plane core. Typically, one modem board supported one sector or cell. So to support multi-cell (e.g., three cells or six cells) configurations in such a system, it would be necessary to provide as many modem boards as the number of cells.

As an improvement, a multi-core processor may be used in an LTE wireless base station (e.g., on a modem board). A base station typically requires multiple sectors or cells to provide suitable coverage, but it is possible for a single modem board to support these multiple sectors or cells if a multi-core processor is deployed on the modem board. In that case, an operating system, such as SMP Linux with PREEMPT RT patch, runs on one SMP (symmetric multiprocessing) partition that contains all eight cores. In this configuration the control plane (i.e., non-real time threads and processes) and the data plane (i.e., real time threads and processes) share the same operating system instances even though they are bound to run on different cores.

While these multi-core processors and System on Chip (SOC) devices are extremely powerful, they do consume a lot of power. For example, the FSL P4080 8 core processor consumes approximately 27 watts when the cores are running at 1500 MHz. Currently, however, there is no dynamic power control in the base station to reduce the multi-core processor power consumption. Thus, there is a need to reduce the power consumption based on system usage, for example. This would result in cost savings for the service provider and a greener base station that is better for the environment.

Brief Description

Methods and systems for dynamic power control for next generation LTE base stations are described herein. More particularly, a dynamic power control management process may run, for example, in an OA&M module on the control plane core of the base station. The dynamic power control management process typically collaborates with various components, such as a call management processing module and a transport process module, to periodically obtain information regarding the number of active calls as well as the uplink and downlink data rates for a given interval for a particular cell. The dynamic power control management process polls the call management processing module and transport process module periodically according to a tunable parameter for the key values. Based on this information, the dynamic power control management process determines whether a particular cell on the base station is running below a threshold at which dynamic power control could be triggered.

In one embodiment a computer-implemented dynamic power control management (DPCM) method for a base station is provided. The method includes collaborating with a plurality of components operating on at least one core of a multi-core processor to periodically obtain information for a plurality of cells on a base station over a specified interval, wherein the information comprises at least a call load, an uplink data rate, and a downlink data rate for each cell. The method uses the information obtained from the components on the control plane core to determine whether each cell on the base station is running below a specified threshold. When the cell on the base station is operating below the specified threshold, the method triggers a state machine for the cell.

In another embodiment a non-transitory computer-usable data carrier storing instructions that, when executed by a computer, cause the computer to perform a dynamic power control management (DPCM) method for a base station is provided. The method includes collaborating with a plurality of components operating on at least one core of a multi-core processor to periodically obtain information for a plurality of cells on a base station over a specified interval, wherein the information comprises at least a call load, an uplink data rate, and a downlink data rate for each cell. The method further includes using the information obtained from the components on the control plane core to determine whether each cell on the base station is running below a specified threshold. When the cell on the base station is operating below the specified threshold, triggering a state machine for the cell.

Optionally, in any one of the preceding embodiments the method resides in an Operations, Administration, and Management process module on a control plane core of the multi-core processor and the plurality of components includes at least a call management process module and a transport process module and at least one core of the multi-core processor may be a control plane core.

Optionally, in any one of the preceding embodiments the method further includes obtaining call load information for each cell from a call management processing module on a control plane core of the multi-core processor and obtaining uplink and downlink data rates for each cell from a transport process module on a control plane core of the multi-core processor. Optionally, in any one of the preceding embodiments the state machine for dedicated cores in the multi-core processor includes at least a normal state, a dynamic frequency scaling (DFS) state, a doze state, and a nap state. In that case, the state machine for each cell operates in the following manner: (a) the state machine transitions to the DFS state when the system load is less than or equal to half the full system capacity (or any other appropriate specified threshold) for a number of consecutive polling cycles N; (b) the state machine transitions to the doze state when there is no system load for a particular cell while the cell is in the DFS state for a number of consecutive polling cycles D; (c) the state machine transitions to the nap state when there is no system activity for a consecutive number of polling cycles E while the cell is in the doze state; (d) the state machine transitions from the doze state to the DFS state when a call is received on the cell; (e) the state machine transitions from the nap state to the DFS state when a call is received on the cell; and (f) when the state machine is in DFS state and the system load increases above the threshold P for a number of consecutive polling cycles M, the state machine reverts back to the normal state.

Optionally, in any one of the preceding embodiments the state machine for shared cores in the multi-core processor includes at least a normal state and a dynamic frequency scaling (DFS) state. In that case, the state machine transitions to the DFS state when the system load is less than or equal to half the full system capacity for a number of consecutive polling cycles N. When the system load increases above the threshold P for a number of consecutive polling cycles M, the state machine reverts back to the normal state.

Further scope of the applicability of the exemplary embodiments will become apparent from the detailed description provided below. It should be understood, however, that the detailed description and specific examples, while indicating preferred embodiments, are given by way of illustration only, since various changes and modifications within the spirit and scope of the exemplary embodiments will become apparent to those skilled in the art.

BRIEF DESCRIPTION OF THE DRAWINGS

The present exemplary embodiments exist in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

It is to be understood that the functions of the various elements shown in the figures, including any functional blocks labeled as "modules" or "processes" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

Figure 1:
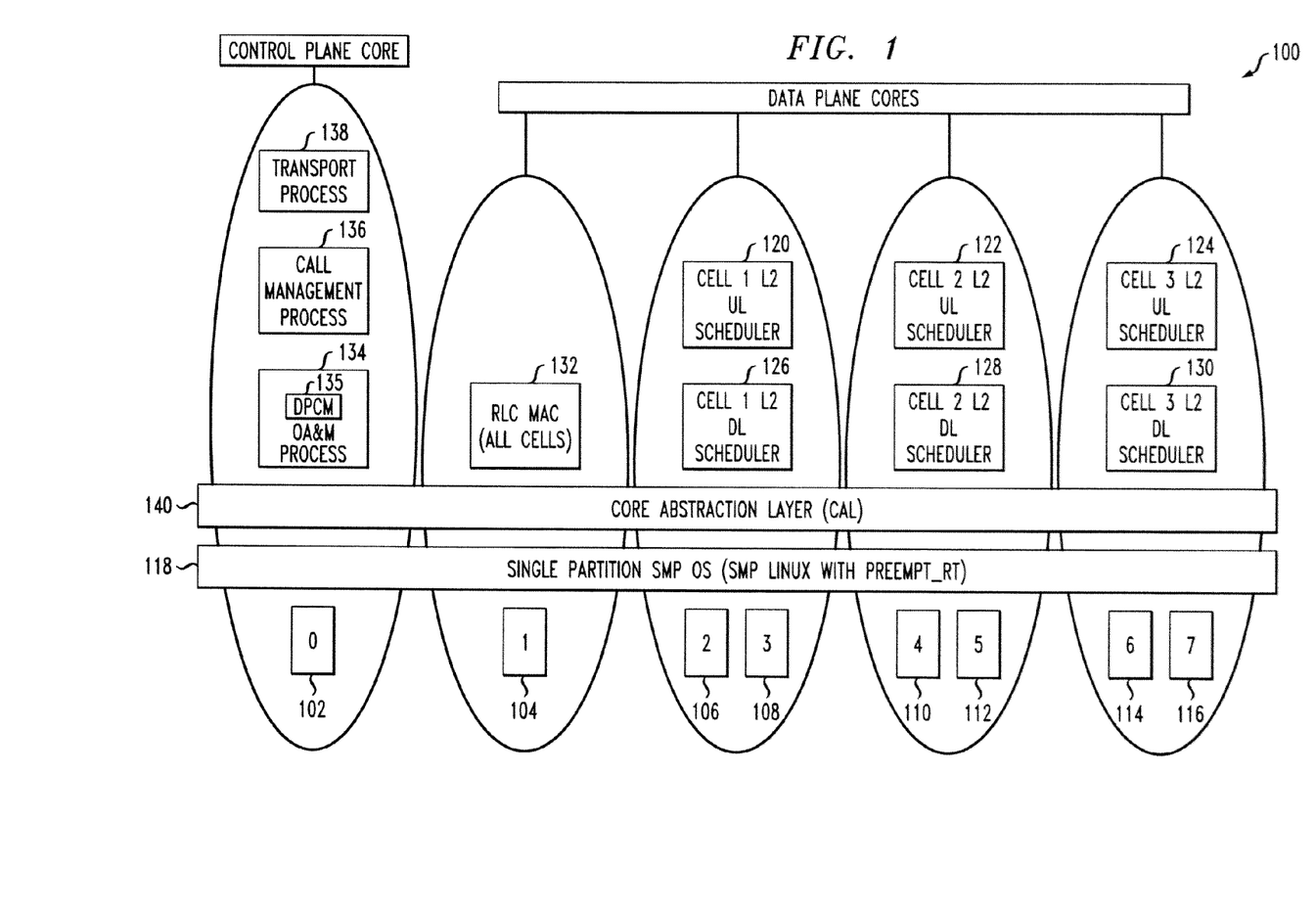
FIG. 1 is a module diagram of an exemplary platform architecture with core reservation and core affinity in accordance with aspects of the exemplary embodiments.

Referring now to the drawings wherein the showings are for purposes of illustrating the exemplary embodiments only and not for purposes of limiting the claimed subject matter, FIG. 1 provides a view of a platform architecture (i.e., a multi-core processor) 100 into which the presently described embodiments may be incorporated. It is to be appreciated that while this architecture is generally used on a modem board in a base station, it also may be used in other like applications. In this embodiment one partition is generally defined with all eight cores in it (102, 104, 106, 108, 110, 112, 114, and 116). It is to be appreciated, however, that the multi-core processor 100 may have any number of cores. With this embodiment it is thus possible to use a single symmetric multiprocessing (SMP) operating system (OS) instance 118 that runs on all of the cores (e.g., eight cores). Since the control and data planes are under one operating system instance, care is generally needed to ensure that a problem with the data plane will not bring down the control plane as well.

In this embodiment, the multi-core processor 100 serves three cells (Cell 1, Cell 2, and Cell 3). Each cell requires an uplink (UL) scheduler module (shown as 120, 122, and 124 in the figure) and a downlink (DL) scheduler module (shown as 126, 128, and 130 in FIG. 1). Each cell has dedicated cores as well as common shared cores. For example, as shown in FIG. 1, cell 1 utilizes dedicated cores 2 (106) and 3 (108) and common shared cores 0 (102) and 1 (104). It is to be understood that while only one configuration is represented in FIG. 1 other configurations are possible.

A Radio Link Control (RLC) layer is typically used to segment, concatenate and correct errors on packet frames sent and received across the LTE air interface. The Radio Link Control and Medium Access Control (RLC/MAC) software is used in the GPRS (2.5G) wireless stack. It provides the acknowledged and the unacknowledged data transfer between the mobile station and the base station controller (BSC). Thus, the architecture 100 also includes an RLC/MAC module 132, which is the basic transport unit on the air interface that is used between the mobile station and the network. The RLC/MAC module 132 is generally used to carry data and RLC/MAC signaling.

The control plane core 102 of the multi-core processor 100 also includes an Operations, Administration, and Management (OA&M) module 134. OA&M is generally used to describe the processes, activities, tools, standards, and the like involved with operating, administering, managing and maintaining components in the telecommunications network. In accordance with aspects of the exemplary embodiments, the OA&M module 134 also includes a dynamic power control management (DPCM) process 135, as described in greater detail below.

A call management processing (or CALLP) module 136 typically manages the non-real-time aspects of the base station's call processing activities. A transport process module 138 contains information about all the Signaling Radio Bearer (SRB) and the Traffic Radio Bearer (TRB) channels that are created on the modem board to support the data calls on the various cells. The transport process module 138 module also provides statistics information concerning the uplink and downlink data rates supported by the TRB channels for a particular cell.

In addition, the architecture 100 includes a core abstraction layer (CAL) 140, which generally hides the core specific details from the Layer 2 (L2) application software. Layer 2 is the Data Link Layer of the seven-layer Open Systems Interconnection (OSI) model of computer networking. The Data Link Layer is the protocol layer that transfers data between adjacent network nodes in a wide area network or between nodes on the same local area network segment. The Data Link Layer provides the functional and procedural means to transfer data between network entities and might provide the means to detect and possibly correct errors that may occur in the Physical Layer. Examples of data link protocols are Ethernet for local area networks (multi-node), the Point-to-Point Protocol (PPP), HDLC and ADCCP for point-to-point (dual-node) connections. In this case, L2 generally refers to the L2 scheduler processing that is needed for the LTE air interface, which has very tight real time requirements.

To meet the real time performance needs of the base station, which is generally responsible for handling traffic and signaling between a mobile communication device and the network switching subsystem, an operating system such as SMP Linux with PREEMPT RT patch may be used. Of course, it is to be understood that other operating systems may be used. To achieve deterministic behavior in such an SMP configuration, the system is preferably implemented in a manner that employs core reservation and core affinity constructs to achieve a system behavior that is comparable to Asynchronous Multiprocessing (AMP). This is also desirable to get the best performance out of SMP Linux with PREEMPT RT, for example. Use of lockless zero copy services, such as buffer management and messaging services, may also help address any latency issues that may be posed by the use of the SMP Linux with PREEMPT RT operating system.

One of the main functions of the core abstraction layer 140, as shown in FIG. 1, is to provide high-level applications, such as L2 processing, with various services that utilize the full capabilities of the multi-core platform. The core abstraction layer 140 is thus designed to achieve several goals. First, the core abstraction layer 140 supports a BED (Backplane Ethernet Driver) interface, which is based on the new Data Path Acceleration Architecture (DPAA), while hiding the DPAA and multi-core specific implementations from higher-level application software (i.e., L2 software). (The DPAA is designed to optimize multi-core network processing such as load spreading and sharing of resources, including network interfaces and hardware accelerators.) Second, the core abstraction layer 140 utilizes the P4080's DPAA hardware components to provide an accelerated data path for user-plane data in both the ingress and egress directions. Third, the core abstraction layer 140 provides as much flexibility as possible so to easily adapt to configuration changes (i.e., without requiring code changes). An example of a CAL configuration is a DPAA resources configuration for buffer pools, ingress frame queues, and egress frame queues.

As illustrated in FIG. 1, one embodiment uses all of the processor cores in one partition. An open source operating system is typically used to reduce the cost. Since it may be difficult for simple Linux to meet all of the hard real-time processing needs, an operating system such as SMP Linux with PREEMPT RT patch is preferred. The system further incorporates core affinity and CPU reservation capabilities of SMP Linux to define an AMP-like system behavior within the SMP configuration, which permits six-cell or even nine-cell configurations. Because the operating system instance is shared between non-real time cores (such as the control plane) and real time cores (such as the data planes), problems may arise when a lock is taken by a non-real time threads and processes. A lock may cause a delay for a real time thread or process, since the real time thread or process has to wait for the release of the lock for the data plane core(s). It is known that transport Layer protocols, such as the Transmission Control Protocol (TCP), the User Datagram Protocol (UDP), specify a source and destination port number in their packet headers. A port number is a 16-bit unsigned integer. A process associates its input or output channel file descriptors (sockets) with a port number and an IP address, a process known as binding, to send and receive data via the network. The operating system's networking software has the task of transmitting outgoing data from all application ports onto the network, and forwarding arriving network packets to a process by matching the packets IP address and port numbers. Since the standard Linux protocol stack does not guarantee a lockless implementation, the exemplary embodiments define a lock-less messaging scheme for a real time process (LTE L2 scheduler) running on data plane cores to send and receive TCP/UDP IP packets, while avoiding the use of the Linux protocol stack. The non-real time processes, such as OA&M running on the control plane core, will continue to use the Linux protocol stack for its normal operation.

Generally, to avoid Linux General Public License (GPL) issues, the LTE L2 scheduler is operated in user space. So to send and receive TCP/UDP IP data from the LTE L2 scheduler, data has to cross the user-kernel space boundary. This step typically requires a data copy. Thus, consuming processor power to copy data from one memory location to another wastes precious resources. Accordingly, it is desirable to include a means for providing an efficient lock-less, zero copy and non-blocking messaging service for the real time threads and processes running on the data plane cores, while allowing the control plane to operate in its normal manner (such as by using the traditional Linux protocol stack).

Since both the control plane (i.e., non-real time processes and threads, such as OA&M, dynamic power control management processing, transport processing, and call processing), and the data plane (i.e., real time process and threads, such as the LTE L2 scheduler), share the same operating system instance, it is helpful to make sure that there is at least some physical separation of cores on which these two types of activities are conducted.

Accordingly, the architecture 100 employs a core reservation and core affinity construct. All non-real-time threads or processes will be bound to at least one core that is dedicated for the control plane activities, such as core 0 (102). In other words, core groupings that are dedicated for the data plane activities, such as cores 1-7 (102, 104, 106, 108, 110, 112, 114, and 116) will not host or run any threads that are not directly needed for the "fast path" (data path) implementation or L2 processing. "Fast path" is a term used to describe a path with shorter instruction path length through a program as compared to the "normal path." For a fast path to be effective it must handle the most commonly occurring tasks more efficiently than the normal path, leaving the latter to handle uncommon cases, corner cases, error handling, and other anomalies. Fast paths are a form of optimization. Ingress buffer pools used by a fast path driver are an example of system-wide shared resources. They are dedicated to receive user-plane packets.

Each of the cell real-time processes and threads will run on a dedicated core, where no non-real-time process or thread will execute. In this way (1) the non-real time threads will not starve for processing time and (2) the non-real-time thread will not take any valuable processing time away from the real-time threads and do not add to the processing latency spike on the data core that has strict real time processing requirements.

A number of factors (or inputs) may be utilized to determine whether the base station is running at off-peak capacity (e.g., at less than half the capacity). It should be noted that the definition of "off-peak" may vary depending on the circumstances and the needs of the service provider. These factors may include, for example, the number of active calls supported by the base station and the uplink and downlink data rates supported on the backhaul (or air) interface. The base station is normally designed to support a maximum number of calls per cell with maximum uplink and downlink data rates (per second).

The new dynamic power control management process 135 in the OA&M module 134 typically runs on the control plane core 102 of the base station. The dynamic power control management process 135 typically collaborates with various modules, such as the call management processing module 136 and the transport processing module 138, to periodically obtain information concerning the number of active calls on the base station as well as the uplink and downlink data rates for a given interval (e.g., a snapshot of the last 10 seconds).

Suitably, the dynamic power control management process 135 periodically polls one or more modules on the control plane core of the multi-core processor 100, such as the call management processing module 136 and the transport processing module 138, for the key values, according to a tunable parameter t. The key values (or factors) will be used by the dynamic power control management process 135 to determine whether the base station is operating at off peak capacity. Generally, t represents one cycle (e.g., every 10 seconds). Based on the information that is obtained, the dynamic power control management process determines whether the base station is running below a threshold P where the dynamic power control could be triggered. Again, P is a tunable parameter. To avoid thrashing, whereby the system rapidly switches back and forth between normal and power safe mode, the dynamic power control management process 135 can perform averaging over a given number of intervals N, where N is a tunable parameter.

Figure 2:
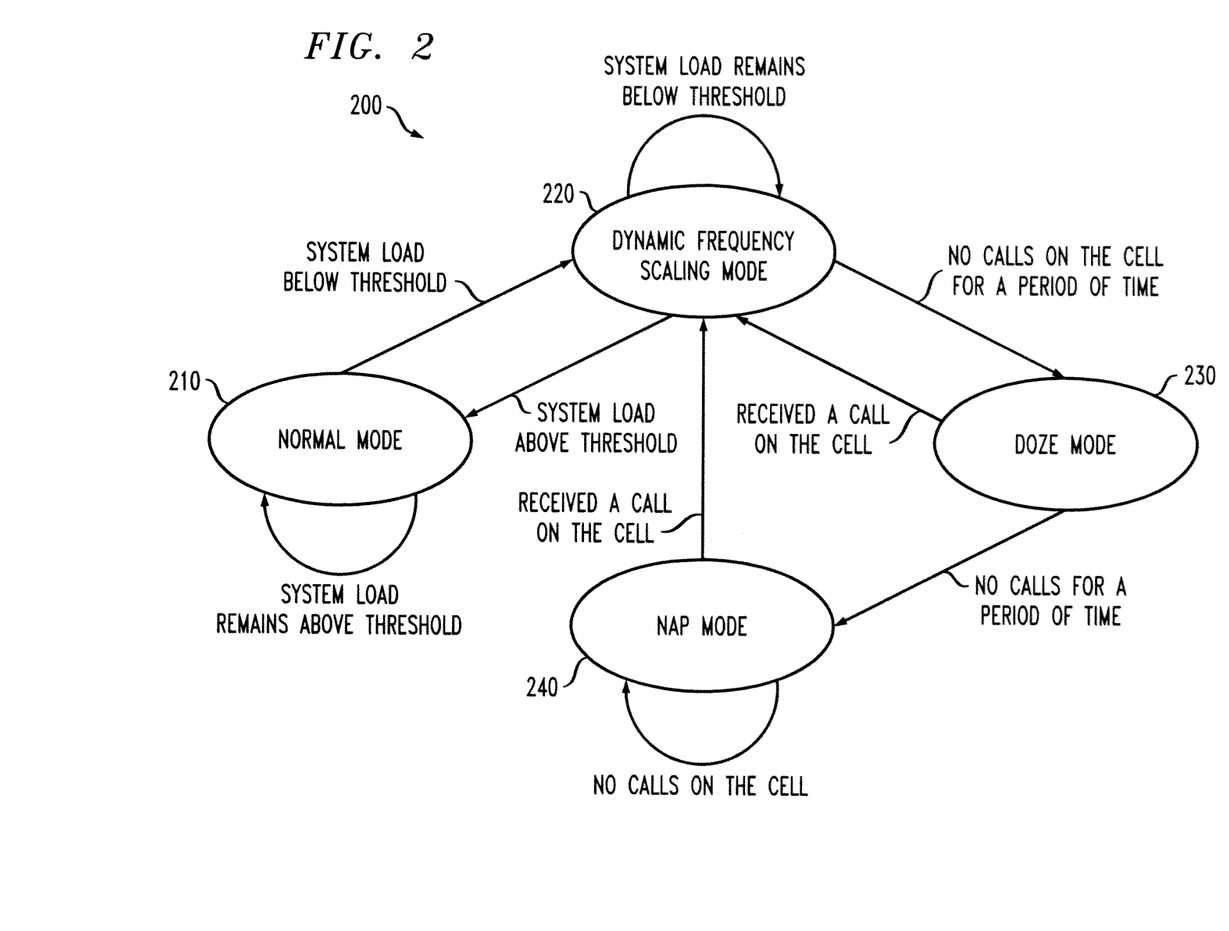
FIG. 2 shows an exemplary dynamic power control state machine for each cell and its associated dedicated cores.

The dynamic power control management process 135 can be implemented, for example, in conjunction with one or more state machines. A state machine is a behavior model composed of a finite number of states, transitions between those states, and actions. The state flow diagram of a suitable dynamic power control state machine 200 for each cell and its associated data plane cores is shown in FIG. 2. As shown in the figure, the state machine 200 generally includes various states (or modes), including, but not limited to, a normal state (210), a dynamic frequency scaling (or DFS) state (220), a doze state (230), and a nap state (240). The general operation of the state machine 200 begins in the normal state 210 and goes through one or more transitions, depending on the input to different states. Typically, all of the states shown are used to obtain maximum dynamic power control. In the future, if the need arises and if any new chipset capabilities are introduced, there is a possibility that more states could be added to the state machine 200 for improved dynamic power control management. Each of these states will be described in greater detail below.

The DPCM process 135 wakes up periodically every t seconds (e.g., 10 seconds) and polls components such as the call management processing module 136 and/or the transport processing module 138. The state machine 200 for each cell remains in the normal state 210 so long as the system load remains above the pre-selected threshold P for the particular cell. When the state machine 200 is in the normal state 210, there is no power control. That is, typically all of the cores will be running at full system frequency.

The state machine 200 for a particular cell, however, transitions to the DFS state 220 when the system load is less than or equal to half the full system capacity for a number of consecutive polling cycles (or intervals) N. In this state, dynamic frequency scaling for the cores dedicated for the cell will be employed. More particularly, the cores will be run at less than maximum operating frequency in order to reduce the dynamic power. By way of example, the cores could be run at 800 MHz instead of 1500 MHz, thus resulting in as much as a 10% savings in power consumption. If the system load increases above the threshold P, the state machine 200 can revert back to the normal state 210.

The state machine 200 transitions to the doze state 230 when there is no system load for a particular cell while the cell is in the DFS state 220 for a number of consecutive polling cycles (or intervals) D. In that case, no further instruction fetching by the cores is conducted. More particularly, the cores are halted but their clocks remain active. That is, the cores will not be performing any functions. If a call does arrive at the cell, the state machine 200 will transition back to the DFS state 220.

The state machine 200 transitions to the nap state 240 when there is no system activity for a period of time (i.e., E cycles or intervals) for a particular cell that is in the doze state 230. In that case, the relevant cores are put into core nap mode. That is, all clocks are gated off. The single core active/nap power ratio at 1500 MHz is approximately 1.6/0.8 Watts. This could result in additional power savings. The doze state 230 and the nap state 240 together may result in around a 20% reduction in power consumption. When a call does arrive at the cell, the state machine 200 will transition back to the DFS state.

Figure 3:
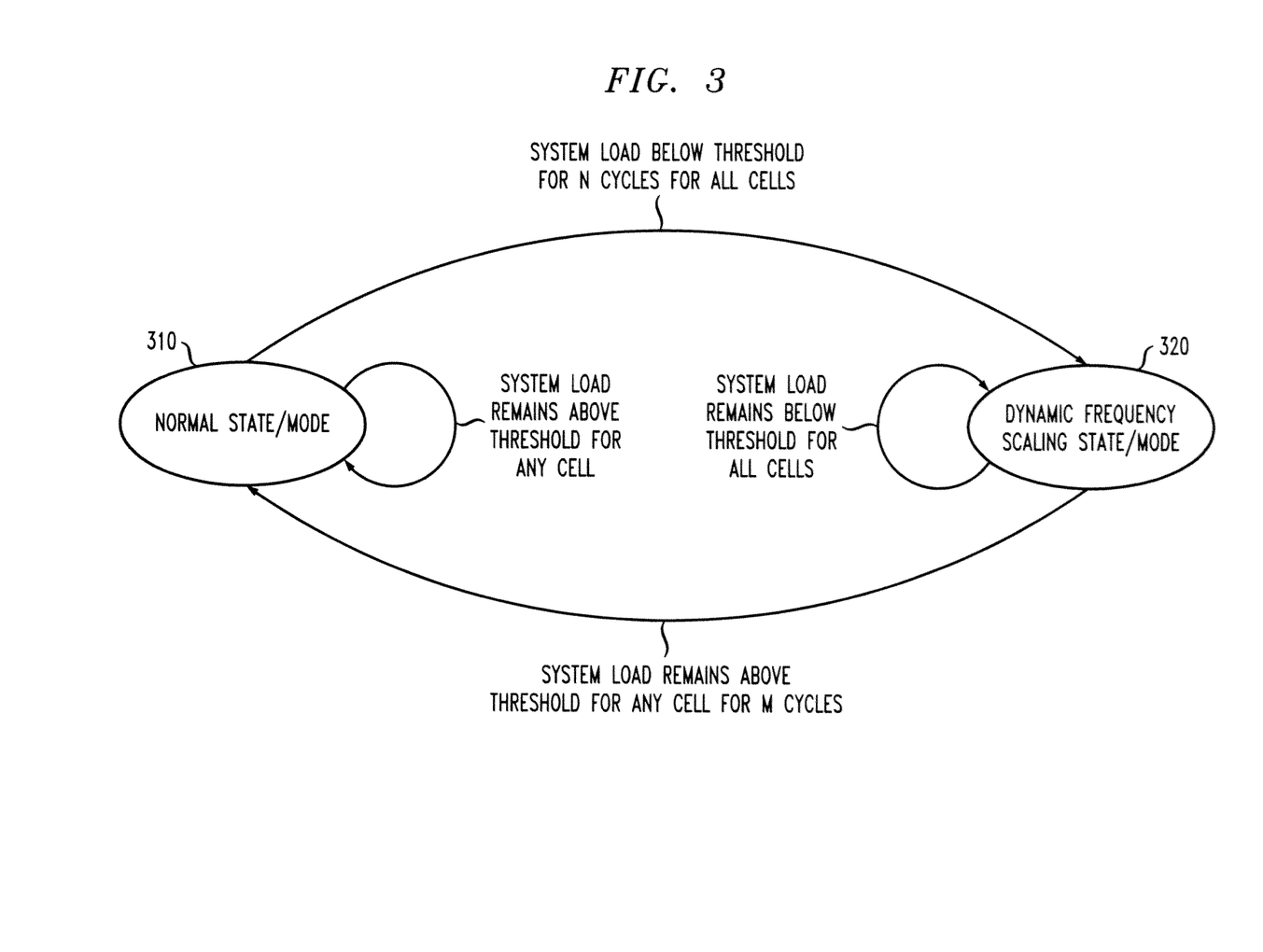
FIG. 3 shows an exemplary dynamic power control state machine for one or more shared control and data plane cores.

The state flow diagram of a suitable dynamic power control state machine 300 for one or more shared control and data plane cores is shown in FIG. 3. For example, the shared control and data plane cores may be core 0 (102) and core 1 (104), as shown in FIG. 1. As shown in FIG. 3, the state machine 300 generally includes at least two states (or modes), including, but not limited to, normal state (310) and dynamic frequency scaling (or DFS) state (320). The general operation of the state machine 300 begins in the normal state 310 and goes through one or more transitions, depending on the input to different states. Typically, each of the states shown is used to obtain maximum dynamic power control. In the future, if the need arises and if any new chipset capabilities are introduced, there is a possibility that more states could be added to the state machine 300 for improved dynamic power control management. Each of these states will be described in greater detail below.

The DPCM process 135 wakes up periodically every t seconds (e.g., every 10 seconds), and polls components such as the call management processing module 136 and/or the transport processing module 138. The state machine 300 for each shared core remains in the normal state 310 so long as the system load remains above the specified threshold P for all the cells configured on the base station. When the state machine 300 is in the normal state 310, there is no power control. That is, typically the cores will be running at full system frequency.

The state machine 300 for a shared core, however, transitions to the DFS state 320 when the system load is less than or equal to a specified threshold P such as half the full system capacity for a number of consecutive polling cycles (or intervals) N for all configured cells on the base station. In this state, dynamic frequency scaling for the shared cores will be employed. More particularly, the shared cores will be run at less than maximum operating frequency in order to reduce the dynamic power. If the system load increases above the specified threshold P for a number of consecutive polling cycles (or intervals) M for any of the configured cell on the base station, the state machine 300 can revert back to the normal state 310.

Figure 4:
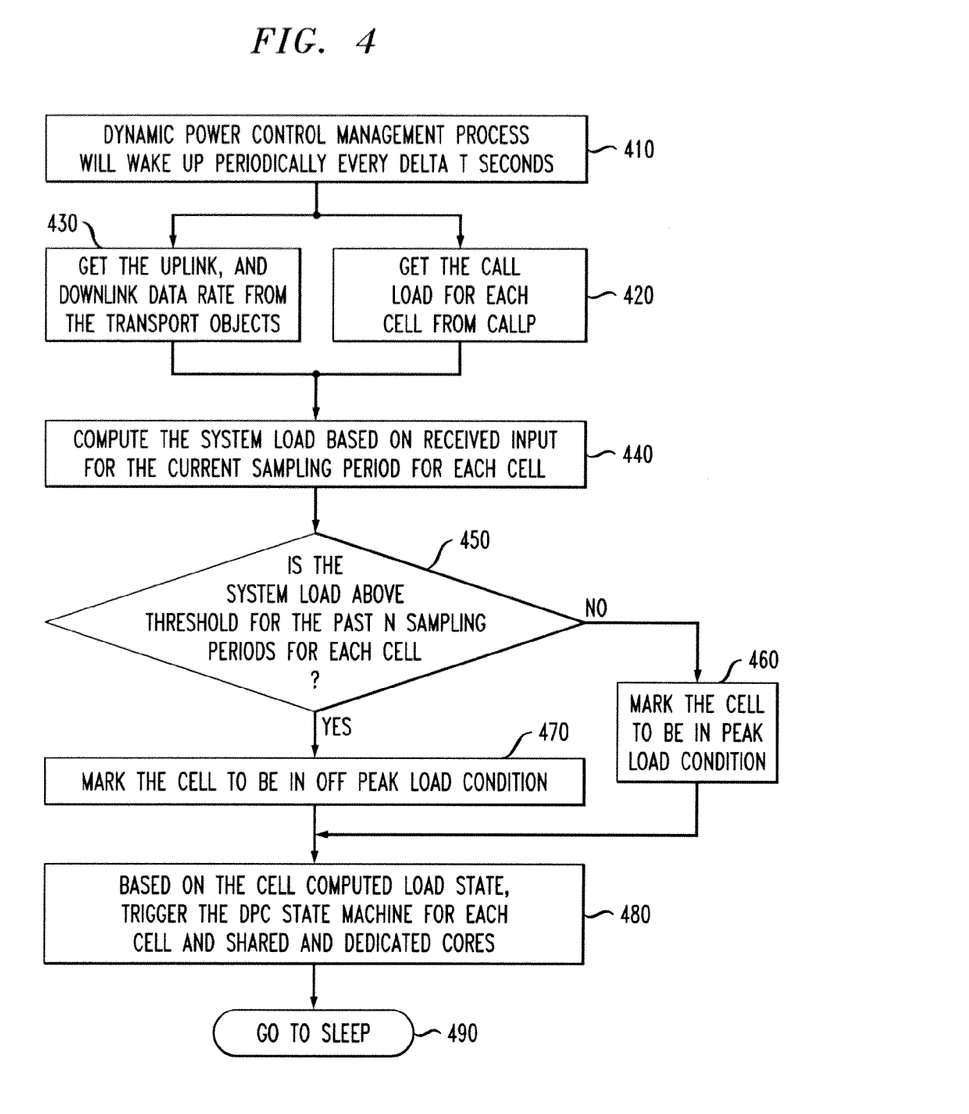
FIG. 4 shows a flow chart for the dynamic power control algorithm.

FIG. 4 shows a flow chart which illustrates the basic operation of the dynamic power control management process 135 with reference to the state machine 200. Note that the acts are listed in a particular order in the flow chart. However, this order should not be considered limiting, as the order of many of these acts may be changed without affecting the resulting power control management process. Initially, the dynamic power control management (DPCM) process 135 "wakes up" periodically, i.e., every delta t seconds (410). Next, the DPCM process obtains the call load for each cell from a module such as the call management processing module (or CALLP) 136 (420). The DPCM process 135 also obtains the uplink and downlink data rates from a module such as the transport objects module 138 (430). Next, the DPCM process 135 computes the system load based on the received input for the current sampling period for each cell (440). A determination is then made as to whether the system load is above a given threshold for the past N sample period(s) for each cell (450). If not, then the cell is marked as being in peak load condition (460). Otherwise, the cell is marked as being in off peak load condition (470). Based on the cell computed load state, the state machines 200 and 300 are triggered for each cell and for its associated dedicated and shared cores (480). Finally, the DPCM process 135 goes back to sleep (490).

Figure 5:
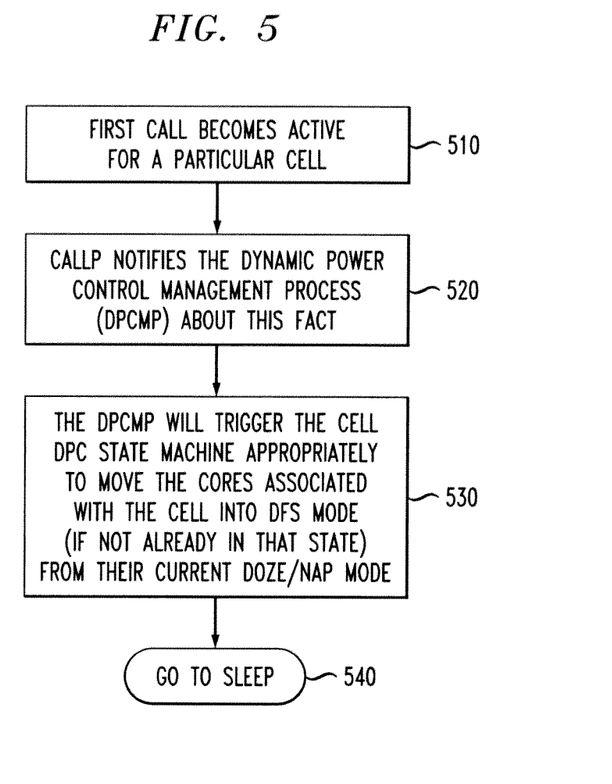
FIG. 5 shows a flow chart for the dynamic power control algorithm with a trigger from the call management processing module.

FIG. 5 shows a flow chart representing the operation of the DPCM process 135 when a trigger from the call management processing module 136 is received. Note that the acts are listed in a particular order in the flow chart. However, this order should not be considered limiting, as the order of many of these acts may be changed without affecting the power control management process. Initially, a first call becomes active for a particular cell (510). The call management processing module 136 notifies the DPCM process 135 about the call being active (520). The DPCM process 135 triggers the core state machine 200 appropriately to move the cells, and the dedicated cores associated with the cell into DFS state 220 (if not already in that state) from their current doze or nap states (530). Finally, the DPCM process 135 goes to sleep (540).

A person of skill in the art would readily recognize that steps of various above-described processes and methods can be performed by programmed computers. Herein, some embodiments are also intended to cover program storage devices, for example, digital data storage media, which are machine or computer readable and include encoded machine-executable or computer-executable programs of instructions, wherein said instructions perform some or all of the steps of said above-described methods. The program storage devices may be, for example, digital memories, magnetic storage media such as a magnetic disks and magnetic tapes, hard drives, or optically readable digital data storage media. The embodiments are also intended to cover computers programmed to perform said steps of the above-described methods.

The methods and processes described herein may be implemented in a non-transitory computer program product that may be executed on a computer or other type of computing device. The computer program product may be a tangible computer-readable recording medium (or computer-usable data carrier) on which a control program is recorded, such as a disk, hard drive, or may be a transmittable carrier wave in which the control program is embodied as a data signal. Common forms of computer-readable media (or data carriers) include, for example, flash drives, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

I claim:

1. A computer-implemented dynamic power control management (DPCM) method for a base station, the method comprising:

collaborating with a plurality of components operating on at least one core of a multi-core processor to periodically obtain information for a plurality of cells supported by a base station over a specified interval, wherein the information comprises at least a call load, an uplink data rate, and a downlink data rate for the cells, and wherein the multi-core processor comprises a plurality of processor cores configured under a single symmetric multiprocessing partition and served by a single operating system instance that serves a shared control plane core and N cell specific data plane cores, where N is the number of configured cells on the base station;

using the information obtained from the components to determine if individual cells are operating at or below a threshold off-peak capacity over the specified interval;

using the information obtained from the components to determine if the base station is operating at or below a threshold off-leak capacity, over the specified interval;

implementing a plurality of state machines comprising a first type state machine and a second type state machine, wherein the first type state machine is configured to manipulate a processor core frequency of a respective one of the cell specific data plane cores and the second type state machine is configured to manipulate a processor core frequency of the shared data plane core used by the configured cells on the base station;

asynchronously sending at least one state transition trigger to a DCPM module for a first of the first type state machines wherein the at least one state transition trigger is based at least upon a first threshold determination for a first of the configured cells;

asynchronously sending at least one state transition trigger to a DCPM module for the second type state machine, wherein the at least one state transition trigger is based at least upon the threshold determination for the cumulative base station.

2. The method of claim 1, wherein the method is performed by an Operations, Administration, and Management process module on the shared control plane core of the multi-core processor.

3. The method of claim 1, wherein the plurality of components comprises at least a call management processing module and a transport processing module.

4. The method of claim 1, further comprising:

obtaining call load information for at least one cell from a call management processing module on the shared control plane core of the multi-core processor;

obtaining uplink and downlink data rates for at least one cell from a transport process module on the shared control plane core of the multi-core processor.

5. The method of claim 1, wherein the first type state machine governs dedicated cores of the multi-core processor and includes at least a normal state, a dynamic frequency scaling (DFS) state, a doze state, and a nap state.

6. The method of claim 5, wherein the first type state machine operates in the following manner:
the first type state machine transitions to the DFS state when the system load is less than or equal to specified threshold P such as half the full system capacity for a number of consecutive polling cycles C;
the first type state machine transitions to the doze state when there is no system load for a particular cell while the cell is in the DFS state for a number of consecutive polling cycles D;
the first type state machine transitions to the nap state when there is no system activity for a consecutive number of polling cycles E while the cell is in the doze state;
the first type state machine transitions from the doze state to the DFS state when a call is received on the cell;
the first type state machine transitions from the nap state to the DFS state when a call is received on the cell;
when the first type state machine is in DFS state and the system load increases above the threshold P for a number of consecutive polling cycles M, the first type state machine reverts back to the normal state.

7. The method of claim 1, wherein the second type state machine governs shared cores of the multi-core processor and includes at least a normal state and a dynamic frequency scaling (DFS) state.

8. The method of claim 7, wherein the second type state machine operates in the following manner:
the second type state machine transitions to the DFS state when the system load is less than or equal to the specified threshold P for a number of consecutive polling cycles C, wherein the specified threshold P is half the full system capacity;
when the system load increases above the threshold P for a number of consecutive polling cycles M, the second type state machine reverts back to the normal state.

9. The method of claim 1, wherein the second type state machine governs shared cores of the multi-core processor.

10. The method of claim 9, wherein the first type state machine includes at least a normal state, a dynamic frequency scaling (DFS) state, a doze state, and a nap state and the second state machine includes at least a normal state and a DFS state.

11. A non-transitory computer-usable data carrier storing instructions that, when executed by a computer, cause the computer to perform a dynamic power control management (DPCM) method for a multi-cell base station, the method comprising:
collaborating with a plurality of components operating on at least one core of a multi-core processor to periodically obtain information for a plurality of cells supported by a base station over a specified interval, wherein the information comprises at least a call load, an uplink data rate, and a downlink data rate for the cells and wherein the multi-core processor comprises a plurality of processor cores configured under a single symmetric multiprocessing partition and served by a single operating system instance that serves a shared control plane core and N cell specific data plane cores, where N is the number of configured cells on the base station;
using the information obtained from the components to determine if individual cells are operating at or below a threshold off-peak capacity over the specified interval;
using the information obtained from the components to determine if the base station is operating at or below a threshold off-peak capacity over the specified interval;
implementing a plurality of state machines comprising a first type state machine and a second type state machine, wherein the first type state machine is configured to manipulate a processor core frequency of a respective one of the cell specific data plane cores and the second type state machine is configured to manipulate a processor core frequency of the shared data plane core used by the configured cells on the base station;
asynchronously sending at least one state transition trigger to a DCPM module for a first of the first type state machines wherein the at least one state transition trigger is based at least upon a first individual cell threshold determination for a first of the configured cells;
asynchronously sending at least one state transition trigger to a DCPM module for the second type state machine, wherein the at least one state transition trigger is based at least upon the cumulative base station threshold determination.

12. The non-transitory computer-usable data carrier of claim 11, wherein the method is performed by an Operations, Administration, and Management process module on the shared control plane core of the multi-core processor.

13. The non-transitory computer-usable data carrier of claim 11, wherein the plurality of components comprises at least a call management processing module and a transport process module.

14. The non-transitory computer-usable data carrier of claim 11, wherein the method further comprises:
obtaining call load information for at least one cell from a call management processing module on the shared control plane core of the multi-core processor;
obtaining uplink and downlink data rates for at least one cell from a transport process module on the shared control plane core of the multi-core processor.

15. The non-transitory computer-usable data carrier of claim 11, wherein the first type state machine governs dedicated cores of the multi-core processor and the second type state machine governs shared cores of the multi-core processor.

16. The non-transitory computer-usable data carrier of claim 15, wherein the first type state machine includes at least a normal state, a dynamic frequency scaling (DFS) state, a doze state, and a nap state and the second type state machine includes at least a normal state and a DFS state.

17. The non-transitory computer-usable data carrier of claim 11, wherein the first type state machine governs dedicated cores of the multi-core processor and includes at least a normal state, a dynamic frequency scaling (DFS) state, a doze state, and a nap state.

18. The non-transitory computer-usable data carrier of claim 17, wherein the first type state machine operates in the following manner:
the first type state machine transitions to the DFS state when the system load is less than or equal to a specified threshold such as half the full system capacity for a number of consecutive polling cycles C;
the first type state machine transitions to the doze state when there is no system load for a particular cell while the cell is in the DFS state for a number of consecutive polling cycles D;
the first type state machine transitions to the nap state when there is no system activity for a consecutive number of polling cycles E while the cell is in the doze state;

the first type state machine transitions from the doze state to the DFS state when a call is received on the cell;

the first type state machine transitions from the nap state to the DFS state when a call is received on the cell;

when the first type state machine is in DFS state and the system load increases above the threshold P for a number of consecutive polling cycles M, the first type state machine reverts back to the normal state.

19. The non-transitory computer-usable data carrier of claim 11, wherein the second type state machine governs shared cores of the multi-core processor and includes at least a normal state and a dynamic frequency scaling (DFS) state.

20. The non-transitory computer-usable data carrier of claim 19, wherein the second type state machine operates in the following manner:

the second type state machine transitions to the DFS state when the system load is less than or equal to the specified threshold P for a number of consecutive polling cycles C, wherein the specified threshold P is half the full system capacity;

when the system load increases above the threshold P for a number of consecutive polling cycles M, the second type state machine reverts back to the normal state.

\* \* \* \* \*